(12) United States Patent
Shinohara

(10) Patent No.: US 6,587,271 B2
(45) Date of Patent: Jul. 1, 2003

(54) IMAGING LENS

(75) Inventor: Yoshikazu Shinohara, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 41 days.

(21) Appl. No.: 10/096,953

(22) Filed: Mar. 14, 2002

(65) Prior Publication Data

US 2003/0053210 A1 Mar. 20, 2003

(30) Foreign Application Priority Data

Apr. 2, 2001 (JP) ........................................ 2001-103534

(51) Int. Cl.[7] ............................................... G02B 27/64
(52) U.S. Cl. ........................ 359/557; 359/554; 359/555; 359/556; 359/666
(58) Field of Search ................................ 359/557, 554, 359/555, 556, 666, 676, 684, 685

(56) References Cited

U.S. PATENT DOCUMENTS

| | | | | |
|---|---|---|---|---|
| 5,315,435 A | | 5/1994 | Horiuchi | |
| 5,638,210 A | * | 6/1997 | Sato et al. | 359/557 |
| 5,831,768 A | * | 11/1998 | Ohtake | 359/557 |
| 6,141,156 A | * | 10/2000 | Aoki | 359/686 |
| 6,169,853 B1 | * | 1/2001 | Hasushita et al. | 396/55 |
| 6,320,698 B1 | * | 11/2001 | Suzuki | 359/557 |

* cited by examiner

Primary Examiner—Mohammad Sikder

(57) ABSTRACT

An imaging lens, is formed of, in order from the object side, a zoom section for focusing and zooming, and a master section for imaging and vibration control. The master section is formed of, in order from the object side, a front lens group, and a rear lens group. The front lens group is afocal so that collimated light enters the rear lens group. The rear lens group includes, in order from the object side, a lens subgroup which is movable normal to the optical axis of the imaging lens for vibration control, and a lens subgroup for macro-imaging adjustment and tracking adjustment, which is movable along the optical axis. Preferably, a fixed lens subgroup is positioned between the lens subgroup for vibration control and the lens subgroup for macro-imaging adjustment and tracking adjustment.

4 Claims, 4 Drawing Sheets

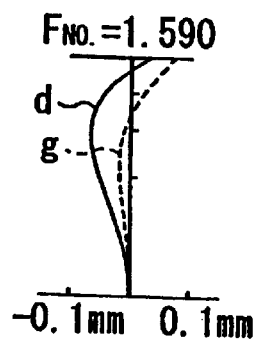 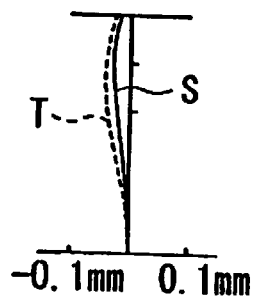 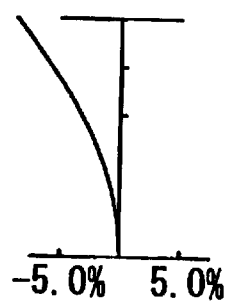
Spherical Aberration
Fig. 4A
Astigmatism
Fig. 4B
Distortion
Fig. 4C
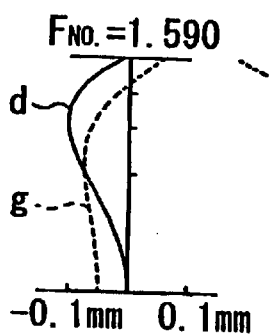 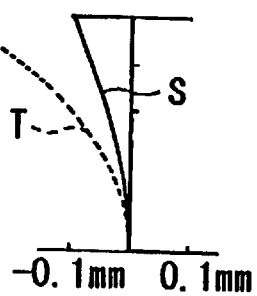 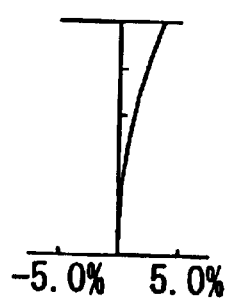
Spherical Aberration
Fig. 5A
Astigmatism
Fig. 5B
Distortion
Fig. 5C
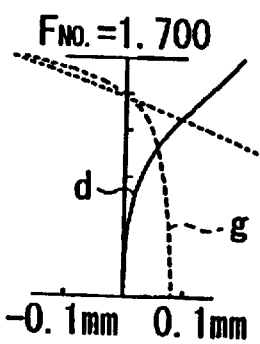 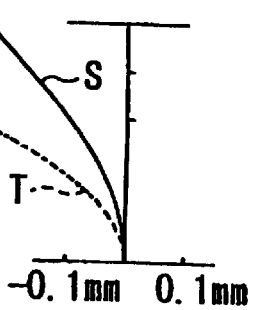 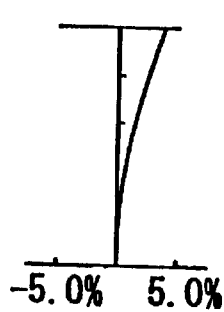
Spherical Aberration
Fig. 6A
Astigmatism
Fig. 6B
Distortion
Fig. 6C

IMAGING LENS

BACKGROUND OF THE INVENTION

Generally, zoom lenses are used in television cameras for broadcasting. The general construction of these zoom lenses, in order from the object side, is as follows: a zoom section which has a focusing function and a zoom function, a master section which has an image-formation function, and a stop (i.e., diaphragm). The zoom section has a focus lens group, a zoom lens group and a correction lens group. The master section may also be referred to as a relay section (i.e., a relay lens). A replaceable extender lens may be attached to the master section for the purpose of switching image magnification. The portion of the optical path where the extender lens is attached is normally where collimated light exits, as occurs with an afocal optical system. This is done for the purpose of diminishing the change of optical performance when one switches to a different image magnification by attaching or removing an extender lens.

A zoom lens for a television camera is usually provided with a macro-imaging function and a tracking adjustment function. The macro-imaging function is for the purpose of providing a coarse adjustment of the position of the image plane of the zoom lens, and the tracking adjustment function is for the purpose of providing a fine adjustment in order to precisely locate the image at the receiving surface of the image detector. Traditionally, a method has been known in which a part of the master section is moved along the optical axis for accomplishing both the macro-imaging function and the tracking adjustment function.

More specifically, one known technique is to divide the master section into a front lens group and a rear lens group. The entire rear lens group is moved along the optical axis during macro-imaging and tracking adjustment. Furthermore, in the case that the master section is divided into a front lens group and a rear lens group, the front lens group is normally equivalent to the above-mentioned extender lens and forms an afocal optical system.

A second known technique is to subdivide the rear lens group into, in order from the object side, a first lens subgroup and a second lens subgroup. The first lens subgroup is moved along the optical axis during macro-imaging adjustment, and the second lens group is moved along the optical axis (luring tracking adjustment.

As a third known technique, the master section is divided into a front lens group and a rear lens group, and the rear lens group is subdivided into first, second and third lens subgroups, in order from the object side. The first lens subgroup is moved along the optical axis during macro-imaging (i.e., coarse focus adjustment), and the third lens group is moved along the optical axis during tracking adjustment (i.e., fine focus adjustment).

Recently, in zoom lenses for television cameras for broadcasting, a function has been added to stabilize the image field. Hereinafter, this will be termed vibration control. This is accomplished by dynamically moving a lens element in a direction normal to the optical axis so as to prevent unwanted high frequency rotational movements of the optical axis. It is desirable that the lens element that is dynamically moved normal to the optical axis be located in a section of the zoom lens where the light is collimated so as to not deteriorate the quality of the image. In other words, in the case that the master section is divided into a front lens group and a rear lens group, with the front lens group forming collimated light, it is desirable that the subsection of the rear lens group that is nearest the object side be the subsection that controls vibration of the image field.

However, in conventional lens construction, when it is attempted to provide a vibration-control function to one or more lens elements, the following problems may occur. First, in zoom lenses that divide the: master section into a front lens group and a rear lens group, when one attempts to provide a vibration-control function to one or more lens elements in the rear lens group, the mechanism for moving the lens elements becomes complex due to the rear lens group also being the one which provides the tracking adjustment function and the macro-imaging function.

In the second known technique discussed above, wherein the rear lens group is subdivided into a first lens subgroup that is moved along the optical axis during macro-imaging adjustment and a second lens subgroup that is moved along the optical axis during tracking adjustment, there is no known way to provide a vibration-control function to the rear lens group.

In the third known technique discussed above, wherein the rear lens group is subdivided into three lens subgroups, with the second (i.e., middle) lens subgroup not being involved with either the macro-imaging function or the tracking adjustment function, a lens element of this second lens subgroup van be moved normal to the optical axis in order to provide the vibration-control function. However, although there are fewer structural problems when a lens element of this second lens subgroup is provided with a vibration-control function, moving a lens element of this lens subgroup for vibration control is not ideal in terms of affect on optical performance since the light is not collimated at this position. Therefore, it is desired to develop a lens that can be provided with a vibration-control function without the occurrence of any structural or optical performance problems.

BRIEF SUMMARY OF THE INVENTION

The present invention is an imaging lens that is suitable for use in a commercial grade television camera for business use, such as broadcasting. The object of the invention is to provide an imaging lens having a vibration-control mechanism in the master section, in addition to the imaging lens having a macro-imaging function and a tracking adjustment function in the master section.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 4A–4C show the spherical aberration, astigmatism and distortion, respectively, of the imaging lens shown in FIG. 1 at the wide-angle end;

FIGS. 5A–5C show the spherical aberration, astigmatism and distortion, respectively, of the imaging lens shown in FIG. 1 at the mid-position of zoom;

FIGS. 6A–6C s:how the spherical aberration, astigmatism and distortion, respectively, of the imaging lens shown in FIG. 1 at the telephoto end.

DETAILED DESCRIPTION

The imaging lens of the present invention is provided with, in order from the object side, a zoom section which provides both a focusing function and a zoom function, and a master section which provides an image-formation function. The master section is formed of, in order from the object side, a front lens group which is afocal, and a rear lens group. Thus, the light which enters the rear lens group is collimated as a result of having passed through the front lens group. The rear lens group includes a lens subgroup that is moved so as to provide a vibration-control function. The lens subgroup for vibration control preferably is constructed of a single lens element that is movable in a direction that is normal to the optical axis. A lens subgroup is also provided in the rear lens group for macro-imaging, and this lens subgroup is movable along the optical axis.

The lens subgroup for vibration control and the lens subgroup for macro-imaging are separate components. This enables the vibration-control mechanism to be easily realized. In addition, the lens subgroup for vibration control is positioned in the rear lens group nearest the object side (i.e., at the position where collimated light enters the rear lens group), so that deterioration of image quality due to vibration control is prevented. With this arrangement, any structural problems and optical performance problems are resolved. Therefore, it is easy to provide a vibration-control function in the master section, in addition to the macro-imaging function and the tracking adjustment function.

It is also desirable that the vibration-control subgroup that is formed of a single positive lens element, satisfy the following Conditions (1) and (2):

$N_d < 1.60$            Condition (1)

$\upsilon_d > 50.0$            Condition (2)

where $N_d$ is the index of refraction, at the d line, of the single positive lens element, and $\upsilon_d$ is the Abbe number, at the d line, of the single positive lens element.

By forming the vibration-control subgroup of a single positive lens element, weight reduction of the parts that are moved for vibration control is achieved. This is critical to successful vibration control. Further, satisfying the above Conditions (1) and (2) results in less degradation in image quality due to movement of the vibration-control mechanism.

According to the present invention, it is desirable that the rear lens group of the master section be constructed to include a fixed lens subgroup that is positioned between the lens subgroup for vibration control and the lens subgroup for macro-imaging. This prevents any possibility of structural interference between the lens subgroup for vibration control and the lens subgroup for macro-imaging when these lens subgroups are moved.

The invention will first be discussed in general terms with reference to drawings.

Figure 1:
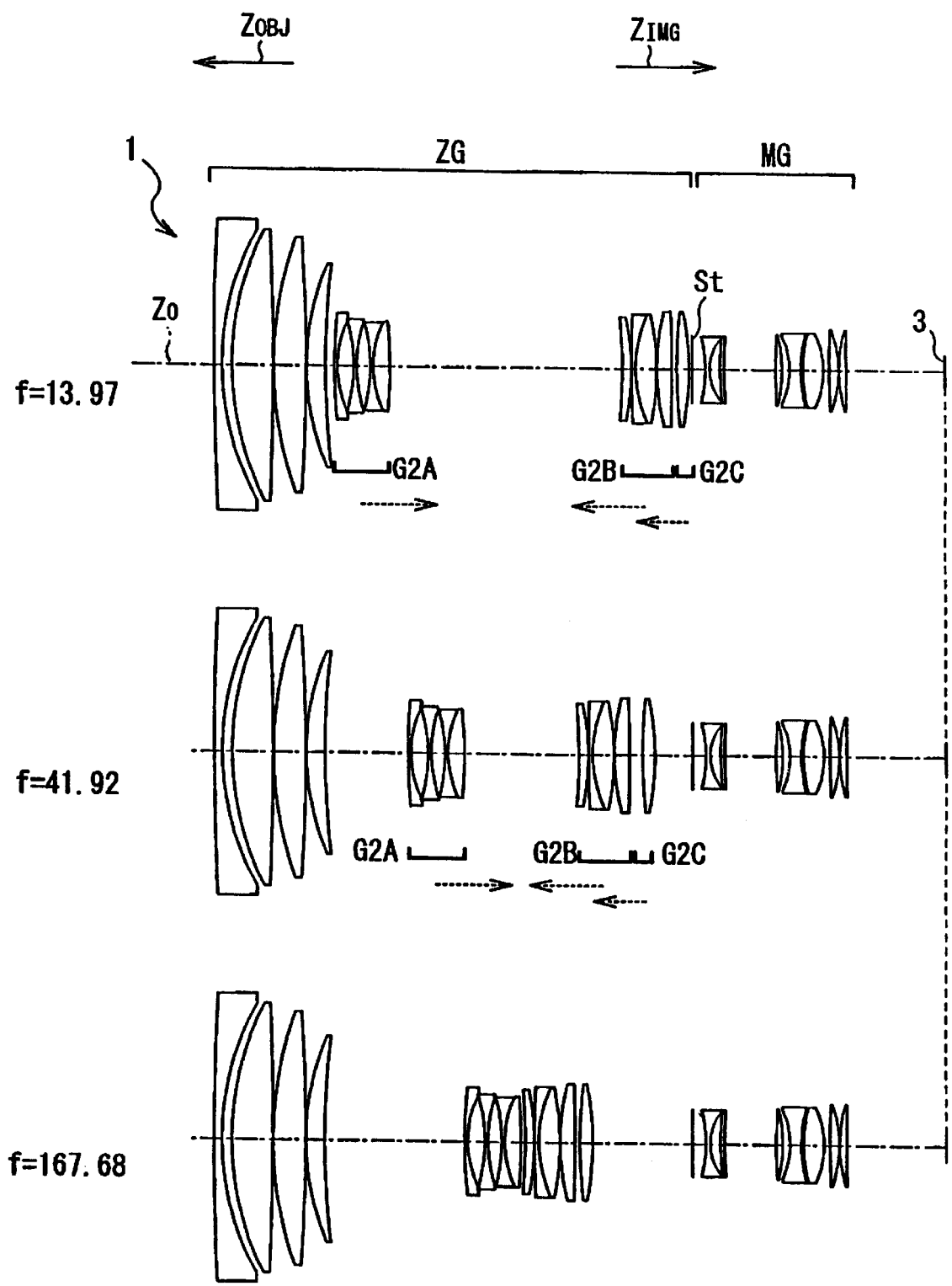
FIG. 1 shows the basic lens element configuration, group spacings and corresponding focal lengths of the imaging lens relating to an embodiment of the present invention.

FIG. 1 shows the basic lens element configuration and positions at three focal lengths of the imaging lens according to an embodiment of the present invention. More specifically, the top portion of the figure shows the arrangement at wide-angle end (f=13.97 mm), the middle portion of the figure shows the arrangement at a mid-position (f=41.92 mm), and the bottom portion of the figure shows the arrangement at the telephoto end (f=167.68 mm).

Figure 2:
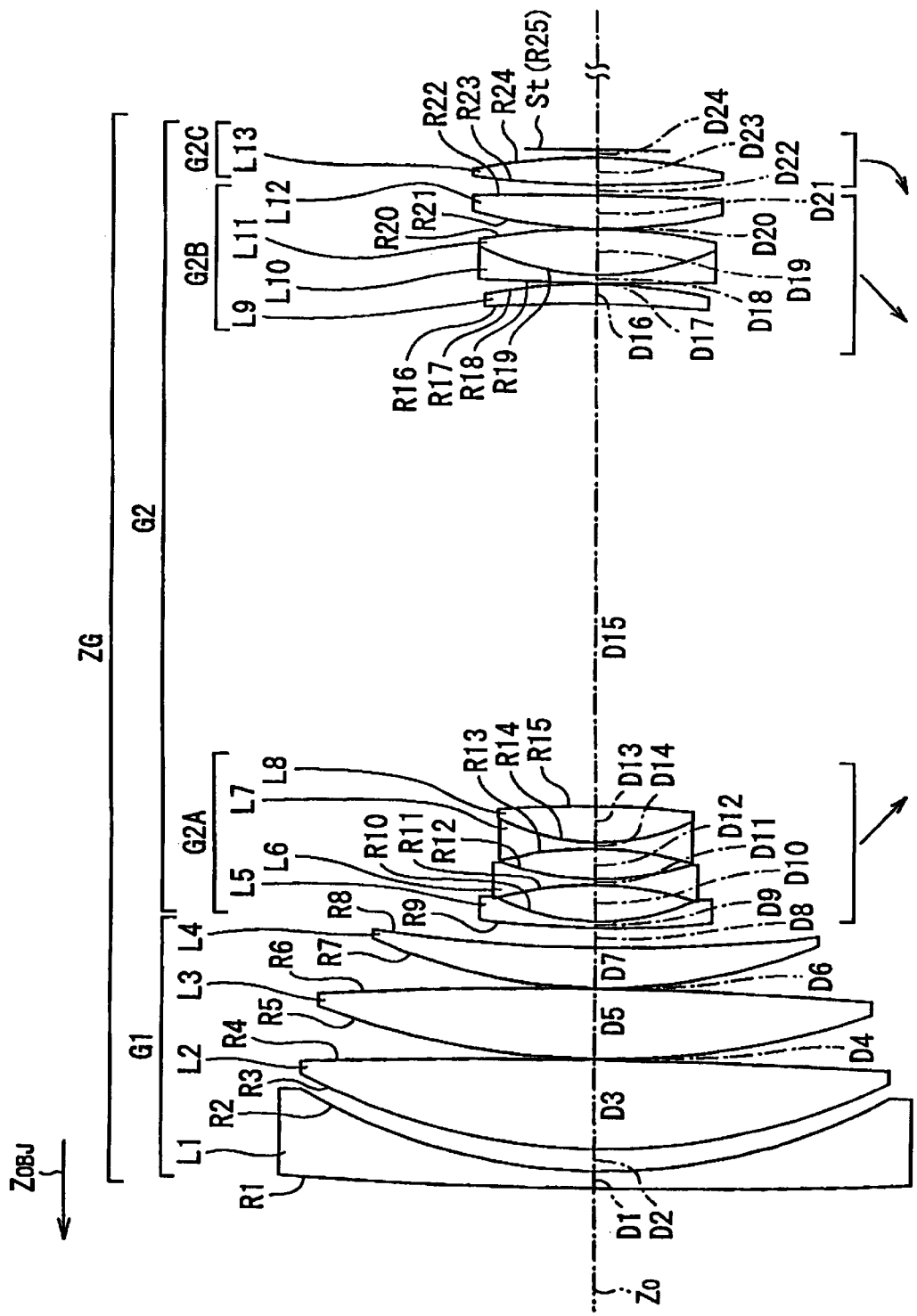
FIG. 2 shows the lens element configuration of the zoom section of the imaging lens shown in FIG. 1, but in greater detail.
Figure 3:
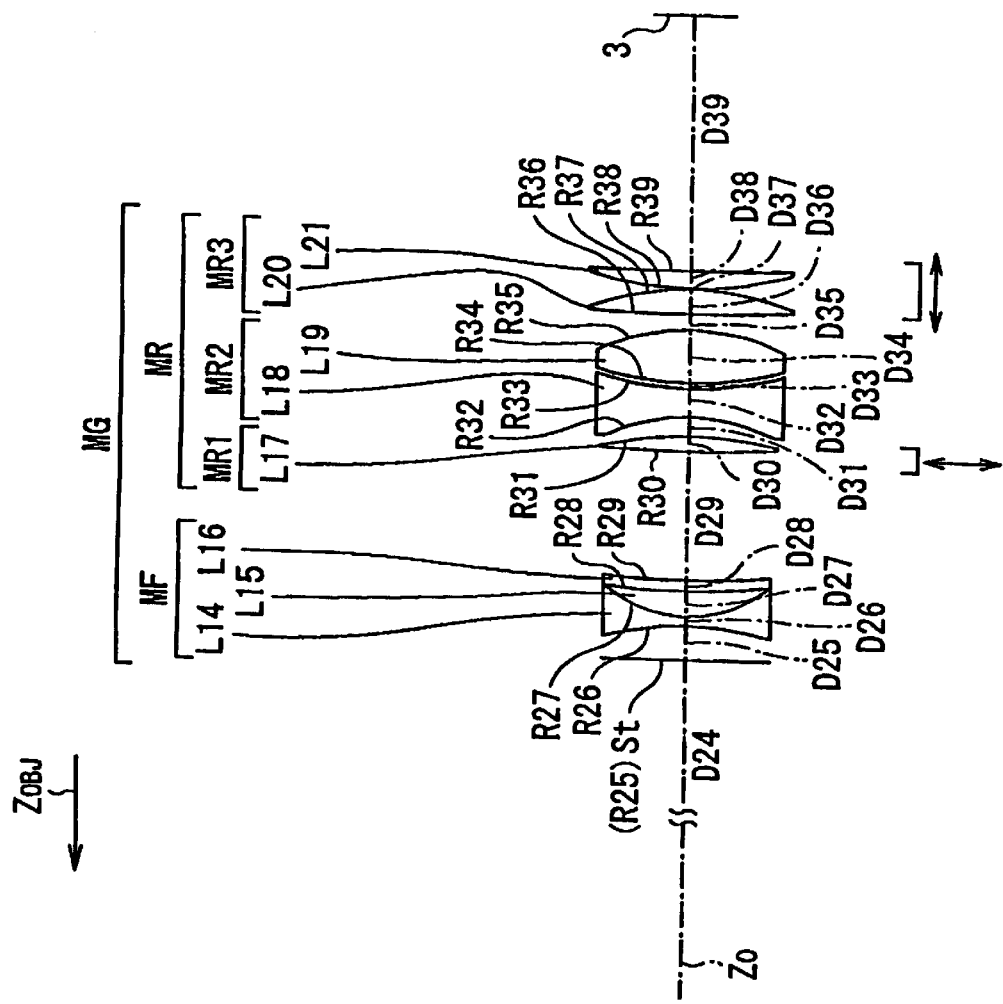
FIG. 3 shows the lens element configuration of the master section of the imaging lens shown in FIG. 1, but in greater detail.

FIG. 2 shows, in more detail, the lens element configuration of the zoom section ZG of the imaging lens 1 shown in FIG. 1. Likewise, FIG. 3 shows, in more detail, the lens element configuration of the master section MG of the imaging lens 1 shown in FIG. 1. In these drawings, $Z_0$ indicates the optical axis, $Z_{OBJ}$ indicates the object side, $Z_{IMG}$ indicates the image side, and 3 indicates the image surface.

As shown in FIG. 1, the imaging lens of the present invention is provided with a zoom section ZG, which performs both a focusing function and a zoom function, and a master section MG, which performs an image formation function. A stop St is located along the optical axis $Z_0$ between the zoom section ZG and the master section MG.

As shown in FIG. 2, the zoom section ZG includes, in order from the object side, a first lens group G1 for focusing and a second lens group G2 for zooming. The first lens group G1 is formed of four lens elements L1–L4, in respective order from the object side. The first lens group G1 is movable along the optical axis for focus adjustment. However, focus adjustment is rarely needed for other than nearby objects. The second lens group G2 includes a first lens subgroup G2A for zooming, a second lens subgroup G2B, and a third lens subgroup G2C, in respective order from the object side. The first lens subgroup G2A may be formed of four lens elements L5–L8, in respective order from the object side. The second lens subgroup G2B may be formed of four lens elements L9–L12, in respective order from the object side. The third lens subgroup G2C may be formed of a single lens element L13. Each of the lens subgroups G2A–G2C of lens group G2 are movable along the optical axis. Such movement results in changing the overall focal length of the imaging lens, concurrently with changing the image magnification so as to provide a zoom function.

More specifically, the lens subgroup G2A provides the function of changing the image magnification from the wide-angle end to the telephoto end by moving from its most object-side position to its most image-side position. On the other hand, the lens subgroups G2B and G2C provide a function o f correcting for what would otherwise be a shifting of the image surface with zooming, by these subgroups moving both individually and as a unit with the lens subgroup G2A when zooming from the wide-angle end to the telephoto end. It is preferable to use the so-called "floating method" in order to adjust the movement of the lens subgroups G2B and G2C.

FIG. 3 shows the lens element configuration of the master section of the imaging lens shown in FIG. 1, but in greater detail. The master section MG is formed of, in order from the object side, a front master lens group MF and a rear master lens group MR. The front master lens group MF may be formed of, in order from the object side, lens elements L14–L16. The front master lens group MF is afocal, and thus allows an extender lens to be added to change the image magnification without affecting the optical performance.

Light that has been collimated by the front master lens group MF is incident onto the rear master lens group MR. The rear master lens group MR is formed of, in relative order from the object side, a first lens subgroup MR1 for vibration control which is constructed so as to be movable in a direction normal to the optical axis, a fixed lens subgroup MR2, and a third lens subgroup MR3 is constructed so as to be movable along the optical axis for the purposes of macro-imaging and tricking adjustment. The fixed lens subgroup MR2 is formed of two lenses, such as lens L18 which consists of a biconcave lens, and lens L19 which consists of a biconvex lens, in respective order from the object side.

It is desirable that the lens group MR1 for vibration control consist of a single positive lens element L17 which satisfies the above Conditions (1) and (2). The lens group MR3 for macro-imaging and tracking adjustment is constructed of, in order from the object side, two lens elements such as lens element L20, which is convex on its image side, and lens element L21, which is convex its object side.

In the case of the only focus adjustment, the lens subgroup MR3 for macro-imaging and tracking adjustment is moved along the optical axis, and this results in fine adjustment of the image surface position (tracking adjustment). If the subgroups of the zoom lens group G2 are moved along the optical axis, zooming (i.e., magnification adjustment) occurs. As zooming will change the focus position of the image, the focus lens group G1 must be appropriately moved along the optical axis in order to refocus the image. In the case of macro-imaging, the lens subgroup MR3 is moved along the optical axis, and the axial position of the focus lens group G1 is adjusted to an appropriate position for correcting the focus. When vibration occurs during mere imaging (herein termed normal imaging) or during macro-imaging, the lens subgroup MR1 for vibration control moves normal to the optical axis, depending upon the magnitude of the vibration. In this way, vibration control is performed.

The lens subgroup MR1 for vibration control and the lens subgroup MR3 for macro-imaging and tracking adjustment are separate components so that the vibration-control function can be easily realized, in terms of structure. The lens subgroup MR1 for vibration control is positioned nearest the object side in the rear lens group MR (i.e., where a collimated light enters), and this prevents deterioration of image quality due to lens movements for vibration control.

In the case that the lens subgroup MR1 for vibration-control is formed of a single positive lens element (as opposed to multiple lens elements), weight reduction is accomplished, and the structure is simplified. In addition, the lens movement for the vibration-control can be promptly and easily performed.

Conditions (1) and (2) restrict the quality of lens material, which comprises the lens subgroup MR1 for vibration control, and the satisfaction of these conditions results in reduced deterioration of image quality due to lens movement upon the occurrence of vibration control. If Conditions (1) and (2) are not satisfied, the image quality may be deteriorated in association with the lens movement upon the occurrence of vibration control.

In the present imaging lens, the fixed lens subgroup MR2 is positioned between the lens subgroup MR1 for vibration control and the lens subgroup MR3 for macro-imaging and tracking, which results in preventing physical interference between the lens subgroup MR1 for vibration control and the lens subgroup MR3 for macro-imaging and tracking when these lens subgroups are moved.

An embodiment of the imaging lens of the invention will now be set forth in detail. The basic lens element configuration of the embodiment has already been discussed above in discussing the invention in general terms, and is as illustrated in FIGS. 1–3.

Table 1 below lists the surface number # in order from the object side, the radius of curvature R (in mm) of each surface, the on-axis spacing D (in mm) between surfaces, as well as the index of refraction $N_d$ and Abbe number $\upsilon_d$ (both at the d line, $\lambda$=587.6 nm) of each optical element of the zoom section ZG (best illustrated in FIG. 2). Zooming is performed by moving the first lens subgroup G2A, the second lens subgroup G2B and the third lens subgroup G2C along the optical axis. Therefore, the values for the on-axis surface spacings D8, D15, D22 and D24 will change during zooming. In the bottom part of the table are listed the surface spacing data for these variables at three positions of zoom, namely, at the wide-angle end, a mid-position, and at the telephoto end. In addition, the focal length of the zoom lens at these three positions is listed.

TABLE 1

| # | R | D | $N_d$ | $\upsilon_d$ |
|---|---|---|---|---|
| 1 | 1386.2 | 4.00 | 1.805115 | 25.5 |
| 2 | 140.28 | 5.00 | | |
| 3 | 151.28 | 20.50 | 1.592383 | 68.3 |
| 4 | −1605.3 | 0.20 | | |
| 5 | 191.1 | 16.30 | 1.696775 | 55.6 |
| 6 | −999.99 | 0.20 | | |
| 7 | 129.93 | 9.40 | 1.712974 | 53.9 |
| 8 | 409.06 | D8 (variable) | | |
| 9 | 251.4487 | 1.50 | 1.712974 | 53.9 |
| 10 | 52.646 | 8.50 | | |
| 11 | −80.4663 | 1.50 | 1.712974 | 53.9 |
| 12 | 71.1446 | 8.30 | | |
| 13 | −84.7633 | 1.50 | 1.696775 | 55.6 |
| 14 | 51.2331 | 8.30 | 1.805115 | 25.5 |
| 15 | −246.036 | D15 (variable) | | |
| 16 | −325.831 | 4.50 | 1.622969 | 58.1 |
| 17 | −129.79 | 0.20 | | |
| 18 | 801.8289 | 20.00 | 1.805115 | 25.5 |
| 19 | 64.7148 | 10.50 | 1.622969 | 58.1 |
| 20 | −136.406 | 0.20 | | |
| 21 | 115.9179 | 7.50 | 1.622969 | 58.1 |
| 22 | −1202.55 | D22 (variable) | | |
| 23 | 236.018 | 6.30 | 1.592383 | 68.3 |
| 24 | −148.323 | D24 (variable) | | |
| 25 | ∞ (stop) | 6.50 | | |

| | D8 | D15 | D22 | D24 |
|---|---|---|---|---|
| Wide-angle end, f = 13.97: | 4.57 | 116.38 | 2.50 | 1.78 |
| Mid-position, f = 41.92: | 41.88 | 57.50 | 6.57 | 19.29 |
| Telephoto end, f = 167.68: | 70.18 | 2.29 | 2.50 | 50.26 |

Table 2 below lists the surface number # in order from the object side, the radius of curvature R (in mm) of each surface, the on-axis spacing D (in mm) between surfaces, as well as the index of refraction $N_d$ and Abbe number $\upsilon_d$ (both at the d line, $\lambda$=587.6 nm) of each optical element of the master section MG (best illustrated in FIG. 3).

TABLE 2

| # | R | D | $N_d$ | $\upsilon_d$ |
|---|---|---|---|---|
| 26 | −62.9047 | 2.00 | 1.772469 | 49.6 |
| 27 | 24.496 | 5.19 | 1.846587 | 23.8 |
| 28 | 130.5932 | 2.01 | 1.805115 | 35.4 |
| 29 | 161.8008 | 25.73 | | |
| 30 | 250. | 3.16 | 1.516314 | 64.1 |
| 31 | −74.2287 | 3.77 | | |
| 32 | −39.0718 | 5.62 | 1.846587 | 23.8 |
| 33 | 65.8592 | 1.14 | | |
| 34 | 70.4692 | 10.39 | 1.516314 | 64.1 |
| 35 | −41.8792 | 2.95 | | |
| 36 | 340.6057 | 4.79 | 1.563822 | 60.7 |
| 37 | −57.1849 | 0.20 | | |
| 38 | 70.4142 | 3.57 | 1.754971 | 52.3 |
| 39 | 294.657 | 50.00 | | |
| 40 | (image surface) | | | |

Table 3 below lists the required movement distance of the lens subgroup MR1 for vibration control for this embodiment at the wide-angle end (f=13.97), a mid-position (f=41.92 mm) and at the telephoto end (f=167.68 mm) in the case that the imaging lens is angularly rotated about the center of the diaphragm St, and when focused at an object 12 meters from the first surface of the imaging lens.

TABLE 3

| Rotation angle | f = 13.97 | f = 41.92 | f = 167.68 |
|---|---|---|---|
| 0.5° | −2.435 | −1.823 | 0.950 |
| 0.4° | −1.925 | −1.433 | 0.785 |
| 0.3° | −1.445 | −1.075 | 0.588 |
| 0.2° | −0.975 | −0.730 | 0.378 |
| 0.1° | −0.488 | −0.365 | 0.188 |

The lens subgroup MR1 for vibration control in this embodiment consists of the lens element L17 which, as illustrated in FIG. 3, is movable normal to the optical axis. This lens element has the surface numbers 30 and 31 in Table 2 above, and the refractive index $N_d$ and the Abbe number $\upsilon_d$ of this lens element are 1.516314 and 64.1, respectively. Thus, Conditions (1) and (2) above are satisfied. FIGS. 4A–4C show the spherical aberration, astigmatism, and distortion, respectively, of the imaging lens at the wide angle end (f=13.97 mm). FIGS. 5A–5C show these same respective aberrations at a mid-position of zoom (f=41.92 mm), and FIGS. 6A–6C show these same respective aberrations at the telephoto end (f=167.68 mm). Unless otherwise indicated, the aberration illustrated is measured at the d-line ($\lambda$=587.6 nm). In FIGS. 4A, 5A, and 6A, the spherical aberration is shown for both the d line and g line ($\lambda$=435.8 nm). In FIGS. 4B, 5B and 6B, the astigmatism is illustrated for both the sagittal image plane S and the tangential image plane T. Furthermore, the F-number $F_{NO}$ for each focal length position is indicated.

The invention being thus described, it will be obvious that the same may be varied in many ways. For example, the radii of curvature and surface spacings may be readily scaled to achieve a lens of a desired focal length, and different optical materials may be selected by appropriately modifying the values of R and D. In addition, the imaging lens of the present invention can be used for applications other than as a lens of a television camera. For example, it may be used with various photographic devices, such as a still camera. Further, zooming may be accomplished by moving different optical components than the ones illustrated. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An imaging lens, is formed of, in order from the object side, a zoom section, which performs both a focusing function and a zoom function, and a master section, which performs an imaging function;

the master section is formed of, in order from the object side, a front lens group which is afocal, and a rear lens group which receives collimated light from the front lens group;

the rear lens group includes, in order from the object side,
a lens subgroup for vibration control which is movable in a direction normal to the optical axis of the imaging lens, and
a lens subgroup for macro-imaging and tracking adjustment which is movable along the optical axis of the imaging lens for the purpose of the macro-imaging adjustment and tracking adjustment.

2. The imaging lens of claim 1, wherein, the lens subgroup for vibration control is formed of a single positive lens element which satisfies the following Conditions (1) and (2):

$N_d<1.60$     Condition (1)

$\upsilon_d>50.0$     Condition (2)

where $N_d$ is the index of refraction, at the d-line, of the single, positive lens element, and $\upsilon_d$ is the Abbe number, at the d-line, of the single, positive lens element.

3. The imaging lens of claim 1, and further including a fixed lens subgroup that is positioned between the lens subgroup for vibration control and the lens subgroup for macro-imaging and tracking adjustment.

4. The imaging lens of claim 2, and further including a fixed lens subgroup that is positioned between the lens subgroup for vibration control and the lens subgroup for macro-imaging and tracking adjustment.

* * * * *

UNITED STATES PATENT AND TRADEMARK OFFICE
CERTIFICATE OF CORRECTION

PATENT NO. : 6,587,271 B2
DATED : July 1, 2003
INVENTOR(S) : Shinohara

It is certified that error appears in the above-identified patent and that said Letters Patent is hereby corrected as shown below:

Title page,
After "*Primary Examiner*—Mohammad Sikder" insert
-- [74] *Attorney, Agent, or Firm*—Arnold International; Bruce Y. Arnold --;

Item [57], ABSTRACT,
Line 1, delete the comma after "lens";

Column 1,
Line 46, change "(luring" to -- during --;

Column 2,
Line 25, change "van be" to -- can be --;

Column 3,
Line 62, change "to drawings" to -- to the drawings --;
Line 67, change "at wide-angle" to -- at the wide-angle --;

Column 4,
Line 37, insert a comma after "magnification";
Line 44, change "o f " to -- of -- ;
Line 45, delete the comma after "zooming";

Column 5,
Line 3, delete the comma after "lens"; and

Column 8,
Line 7, delete the comma after "lens".

Signed and Sealed this

Twenty-eighth Day of October, 2003

JAMES E. ROGAN
*Director of the United States Patent and Trademark Office*